US009483976B2

(12) United States Patent
Jeon et al.

(10) Patent No.: US 9,483,976 B2
(45) Date of Patent: Nov. 1, 2016

(54) METHOD, APPARATUS AND SYSTEM FOR DISPLAY COMPENSATION BASED ON REFERENCE LUMINANCE VALUES OBTAINED FROM TEST PICTURES

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Dong Hyup Jeon, Beijing (CN); Bongyeol Ryu, Beijing (CN); Seong Jun An, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 14/429,086

(22) PCT Filed: Jun. 26, 2014

(86) PCT No.: PCT/CN2014/080899
§ 371 (c)(1),
(2) Date: Mar. 18, 2015

(87) PCT Pub. No.: WO2015/043262
PCT Pub. Date: Apr. 2, 2015

(65) Prior Publication Data
US 2015/0325170 A1 Nov. 12, 2015

(30) Foreign Application Priority Data

Sep. 30, 2013 (CN) .......................... 2013 1 0461487

(51) Int. Cl.
G09G 5/00 (2006.01)
G09G 3/32 (2016.01)
G09G 5/02 (2006.01)

(52) U.S. Cl.
CPC ................ G09G 2320/0626 (2013.01); G09G 2320/0666 (2013.01); G09G 2320/0693 (2013.01); G09G G09G 3/3225 (2013.01); G09G 5/02 (2013.01); G09G 2320/0285 (2013.01);
(Continued)

(58) Field of Classification Search
None
See application file for complete search history.

(56) References Cited

U.S. PATENT DOCUMENTS

2004/0246273 A1* 12/2004 Rykowski ................ G09G 5/06
345/690
2006/0092183 A1* 5/2006 Malmberg ............. G09G 3/006
345/690

(Continued)

FOREIGN PATENT DOCUMENTS

CN         1598918 A      3/2005
CN     101640038 A *     2/2010

(Continued)

OTHER PUBLICATIONS

Written Opinion of the International Searching Authority Appln. No. PCT/CN2014/080899; Dated Sep. 19, 2014.

(Continued)

Primary Examiner — Ilana Spar
Assistant Examiner — Kirk Hermann
(74) Attorney, Agent, or Firm — Ladas & Parry LLP (57) ABSTRACT

A method, an apparatus and a system for display compensation relate to the field of display technique. The method for display compensation includes: measuring luminance of each of pixels in a full-color test picture outputted from a display apparatus in a uncompensated status when the display apparatus outputs the full-color test picture; obtaining a reference luminance value according to the measured luminance values of the respective pixels; obtaining compensation coefficients for the respective pixels according to the reference luminance value and the luminance values of the respective pixels; performing a compensation and correction on signals inputted to the respective pixels respectively according to the compensation coefficients. By utilizing the method, the issue of the non-uniformity of the display effect in the display apparatus can be addressed effectively.

15 Claims, 3 Drawing Sheets

(52) U.S. Cl.
CPC .............. *2320/08* (2013.01); *G09G 2360/147* (2013.01)

(56) References Cited

U.S. PATENT DOCUMENTS

| | | | |
|---|---|---|---|
| 2011/0148940 A1 | 6/2011 | Byun et al. | |
| 2011/0234644 A1* | 9/2011 | Park | G09G 3/2003 345/690 |
| 2013/0016082 A1 | 1/2013 | Coley et al. | |
| 2014/0043369 A1* | 2/2014 | Albrecht | G09G 3/2074 345/690 |

FOREIGN PATENT DOCUMENTS

| | | | |
|---|---|---|---|
| CN | 101895770 A | * | 11/2010 |
| CN | 101996514 A | | 3/2011 |
| CN | 102025952 A | | 4/2011 |
| CN | 102103838 A | | 6/2011 |
| CN | 103489405 A | | 1/2014 |
| JP | 11-015437 A | | 1/1999 |

OTHER PUBLICATIONS

International Search Report Appln. No. PCT/CN2014/080899; Dated Oct. 8, 2014.
First Chinese Office Action Appln. No. 201310461487.9; Dated Mar. 9, 2015.
First Chinese Office Action dated Mar. 9, 2015; Appln. No. 201310461487.9.
Notification to Grant Patent Right; Issuing Date: Aug. 11, 2015 Appln. No. 201310461487.9.

* cited by examiner

METHOD, APPARATUS AND SYSTEM FOR DISPLAY COMPENSATION BASED ON REFERENCE LUMINANCE VALUES OBTAINED FROM TEST PICTURES

TECHNICAL FIELD

The present disclosure relates to a method, an apparatus and a system for display compensation.

BACKGROUND

With progressive development of the display technique, more and more people begin to focus on the Organic Light Emitting Diode (OLED) display element with better display capability. As a current-type light-emitting element, the OLED display element is increasingly applied to a high performance display field due to its features such as self-luminescence, rapid response, wide view angle, and the capability of being manufactured on a flexible substrate. An OLED display element can be classified into a Passive Matrix Driving OLED (PMOLED) display element or an Active Matrix Driving OLED (AMOLED) display element. As the size of the display apparatus is increased, in the conventional PMOLED display, the driving time for a single pixel is required to be reduced, and thus the transient current is required to be increased, which causes a dramatic increasing of the power consumption. In the technique of AMOLED, such issues can be addressed well since the current is input to each of OLEDs via the Thin Film Transistor (TFT) switching circuit when scanning is performed row by row.

In the existing AMOLED panel, most thin film transistor switching circuits adopt Low-temperature poly-silicon thin film transistors (LTPS TFT) or oxide thin film transistors (Oxide TFT). Compared to the general amorphous silicon thin film transistor (amorphous-Si TFT), LTPS TFT and Oxide TFT have higher mobility and more stable characteristics, and thus they are more suitable for being applied into an AMOLED display. However, due to limitations of the crystallization process and the manufacture level, the non-uniformity occurs in the electrical parameters of the TFT switching circuit which is manufactured on a glass substrate with a large size, such as threshold voltage, mobility and the like, so that the shift of the threshold voltage varies in respective TFTs, which results in a current difference and a luminance difference among respective OLED display elements; such differences are perceived by human eyes, and thus the issue of non-uniform display effect arises among respective pixels. Even if a grey voltage of a same grey level is applied to all of the pixels, the issue of non-uniform luminance arises among the pixels due to the non-uniformity among respective pixels, thus deteriorating the display quality and affecting user's experience on use severely.

SUMMARY

In view of the above, in embodiments of the present disclosure, there are provided a method, an apparatus and a system for display compensation capable of addressing the issue of the non-uniformity of the display effect in the display apparatus effectively.

According to one aspect of the present disclosure, there is provided a method for display compensation comprising: measuring luminance value of each of pixels in a full-color test picture outputted from a display apparatus in a uncompensated status when the display apparatus outputs the full-color test picture; obtaining a reference luminance value according to the measured luminance values of the respective pixels; obtaining compensation coefficients for the respective pixels according to the reference luminance value and the luminance values of the respective pixels; performing a compensation and correction on signals inputted to the respective pixels respectively according to the compensation coefficients.

According to another aspect of the present disclosure, there is provided an apparatus for display compensation, wherein the apparatus comprises: a measuring unit configured to measure luminance of each of pixels in a full-color test picture outputted from a display apparatus in a uncompensated status, when the display apparatus outputs the full-color test picture; a calculation unit configured to obtain a reference luminance value according to the measured luminance values of the respective pixels; a processing unit configured to obtain compensation coefficients for the respective pixels according to the reference luminance value and the luminance values of the respective pixels; and a compensation unit configured to perform a compensation and correction on signals inputted to the respective pixels respectively according to the compensation coefficients.

According to still another aspect of the present disclosure, there is provided a system comprising a display apparatus and the apparatus for display compensation as described above.

In such method, apparatus and system for display compensation, when the display apparatus in a uncompensated status outputs a full-color test picture, the luminance of each of pixels in the full-color test picture outputted from the display apparatus is measured; the reference luminance value is obtained according to the measured luminance values of the respective pixels; compensation coefficients for the respective pixels are obtained according to the reference luminance value and the luminance values of the respective pixels, and the compensation and correction are performed on signals inputted to the respective pixels respectively according to the compensation coefficients. In such a way, by measuring the luminance of each of the pixels in the full-color test picture outputted from the display apparatus, the non-uniformity among the luminance of the respective pixels in practical use can be known clearly, and the compensation coefficients can be obtained according to the actual luminance of the respective pixels and the reference luminance, and the luminance of the respective pixels can be compensated for and corrected to the reference luminance by the compensation coefficients, so that the issue of non-uniform display effect in the display apparatus can be addressed effectively, thus improving the display effect of the display apparatus greatly.

DETAILED DESCRIPTION

Hereinafter, clear and complete descriptions will be given to implementations of the present disclosure with reference to accompanying drawings of embodiments of the present disclosure. Obviously, the embodiments as described are only a part of the embodiments of the present invention, not all of the embodiments of the present invention. All other embodiments obtained by those skilled in the art on the basis of the embodiments of the present disclosure fall into the protection scope of the present application.

Figure 1:
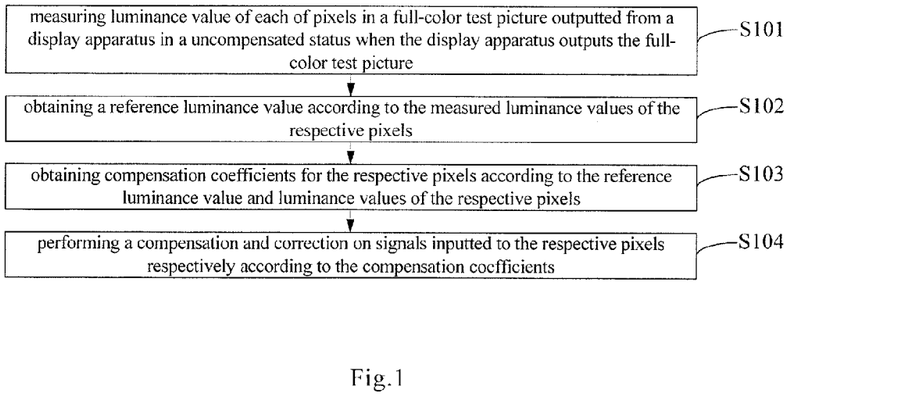
FIG. 1 is a schematic flowchart of a method for display compensation provided in an embodiment of the present disclosure.

FIG. 1 illustrates a method for display compensation provided in an embodiment of the present disclosure.

At step S101, when a display apparatus in a uncompensated status outputs a full-color test picture, the luminance of each of pixels in the full-color test picture outputted from the display apparatus is measured.

At step S102, a reference luminance value is obtained according to the measured luminance values of the respective pixels.

In particular, after quantization values on luminance of the respective pixels are obtained, a value is selected among the quantization values according to a preset formula or manually as the reference luminance value, and the luminance of each of the pixels is adjusted according to the reference luminance value, so that each of the pixels of the display apparatus has uniformity luminance in display. For instance, an average is obtained from the measured luminance values of the respective pixels and is taken as the reference luminance value.

At step S103, for each of the pixels, a compensation coefficient for the pixel is obtained according to the reference luminance value and the luminance value of the pixel.

At step S104, for each of the pixels, a compensation and correction is performed on a signal inputted to the pixel by means of the compensation coefficient for the pixel.

Particularly, the compensation coefficient of a pixel can reflect a numerical relationship between the luminance of the pixel and the reference luminance value, and the input signal (e.g., voltage or current) for the pixel is further adjusted according to the numerical relationship so as to achieve the compensation correction; as an alternative, the compensation coefficient of a pixel can reflect a numerical relationship between the input signal for the pixel and a standard input signal to which the reference luminance value corresponds, and the compensation and correction is directly guided to be performed on the input signal for the pixel according to the numerical relationship.

In such method for display compensation, when the display apparatus in a uncompensated status outputs a full-color test picture, the luminance of each of pixels in the full-color test picture outputted from the display apparatus is measured; the reference luminance value is obtained according to the measured luminance values of the respective pixels; compensation coefficients for the respective pixels are obtained according to the reference luminance value and the luminance values of the respective pixels, and the compensation and correction is performed on signals inputted to the respective pixels by utilizing the compensation coefficients respectively. In such a way, by measuring the luminance of each pixel in the full-color test picture outputted from the display apparatus, the non-uniformity among the luminance of the respective pixels in practical use can be known clearly, and the compensation coefficient can be obtained according to the actual luminance of each of the pixels and the reference luminance, and the luminance of each of the pixels can be corrected to the reference luminance by the compensation coefficient corresponding thereto, so that the issue of non-uniform display effect in the display apparatus can be addressed effectively, thus improving the display effect of the display apparatus significantly.

The uncompensated status of the display apparatus can comprise an initial status in which the display apparatus is powered on and put into use at a first time, or a test status for luminance compensation which is set according to the user's practical requirements during the use of the display apparatus. In order to acquire the luminance variation of the respective pixels in the display apparatus intuitively and accurately, in an embodiment of the present disclosure, a full-color test picture is mainly adopted to observe the luminance of the respective pixels. It can be conceived that in an ideal situation, when a frame of full-color picture is displayed, in the full-color test picture, the luminance outputted from each of the pixels in the display apparatus should be same, and the value of the same luminance is the value of the reference luminance. Since in such a situation, the value of the luminance of each of the pixels is same as that of the reference luminance, it is unnecessary to perform a compensation and correction on the signals inputted to the pixels.

Figure 2:
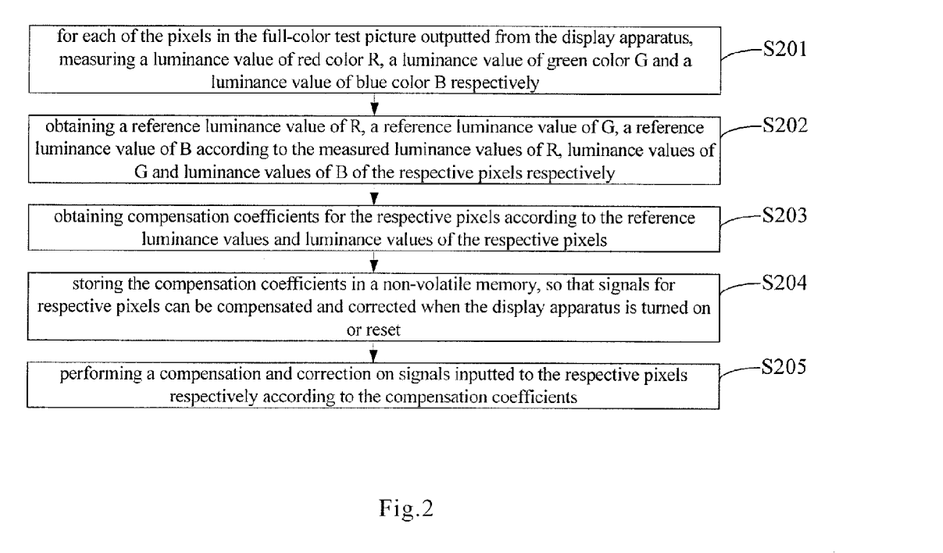
FIG. 2 is a schematic flowchart of another method for display compensation provided in an embodiment of the present disclosure.

In an embodiment of the present disclosure, the full-color test picture particularly refers to a display picture in which all of the pixels of the display apparatus display a same color. For example, the full-color test picture can include a full white test picture; as an alternative, the full-color test picture can include a full red test picture, a full green test picture and a full blue test picture. In an ideal situation, the luminance grey level of the color displayed by each of pixels in the full-color test picture should be equal to a preset luminance grey level, wherein the preset luminance grey level can be selected freely according to the actual requirements. Since the range of grey level represented by 8 bits is normally 0~255, wherein 0 represents the darkest grey level, and 255 represents the brightest grey level. For the purpose of facilitating viewing, in an embodiment of the present disclosure, the grey level of the luminance of the full-color test picture are selected as the grey level of 255 to perform the test. FIG. 2 illustrates a method for display compensation according to an embodiment of the present disclosure. According to an embodiment of the present disclosure, the step S101 in FIG. 1 can be implemented by the step S201 in FIG. 2; in other words, the step in which the luminance of each of pixels in the full-color test picture outputted from the display apparatus is measured can be as follows: in the step S201, for each of the pixels in the full-color test picture outputted from the display apparatus, the luminance of red color R, that of green color G and that of blue color B are measured respectively.

In particular, since the white light is constituted by three colors (red, green and blue (RGB)) lights according to certain proportion mix, when a full white test picture is adopted to test the luminance of the pixels, it is possible to only measure the luminance of the white light of each of pixels; as an alternative, it is possible to measure the luminance of components RGB in the white light respectively utilizing corresponding measuring instruments. Additionally, in a case in which the full-color test picture employs a full red test picture, a full green test picture and a full blue test picture, the full red test picture, the full green test picture and the full blue test picture can all adopt a grey level with the luminance of 255, and the luminance of RGB in the full red test picture, in the full green test picture and in the full blue test picture are measured by utilizing corresponding measuring instruments. In such a way, the difference in the luminance of colors can be compensated accurately.

Further, according to an embodiment of the present disclosure, the step S102 in FIG. 1 can be particularly implemented by the step S202 in FIG. 2. In the step S202, a reference luminance value of R, a reference luminance value of G, a reference luminance value of B can be obtained according to the measured luminance values of R, those of G and those of B of the respective pixels respectively.

In particular, after the quantization values of the respective pixels on luminance are obtained, a value among the quantization values can be selected as a reference luminance value, and the luminance of the respective pixels can be adjusted according to the reference luminance value, so that the uniformity of the respective pixels of the display apparatus in the display luminance can be achieved.

It should be noted that the user can select the reference luminance value by utilizing a plurality of manners according to the actual requirements, and the present disclosure makes no limitation on this. In the embodiments of the present disclosure, selection of the reference luminance value can mainly be implemented in three manners as follows.

For example, the luminance average of all of the pixels can be calculated and obtained from the measured luminance values of the respective pixels, and the luminance average is taken as the reference luminance value.

In general, the manner for calculating the luminance average from the luminance value of the respective pixels is simple, and the circuit configuration for implementing the calculation procedure is relative simple. Further, in the procedure of the actual application of the display apparatus, the luminance variations of the respective pixels normally satisfy a random distribution, the current luminance setting of the display apparatus is well approximated generally by taking the average luminance as the reference value, so that the number of the pixels which need to be compensated for can be reduced as much as possible, thus improving the efficiency of the display compensation.

Optionally, the luminance value with the highest probability in occurrence is calculated and obtained from the measured luminance values of the respective pixels, and the luminance value with the highest probability is taken as the reference luminance value.

In such a manner for calculating the reference luminance value, the luminance value with the highest probability in occurrence is taken as the reference luminance value, so that it is avoided to compensate for the pixels having the same luminance as the luminance value with highest probability in occurrence. Especially, in a case in which the phenomenon of non-uniform luminance occurs in only a small portion of pixels in the display apparatus, it is unnecessary to compensate for a large portion of pixels with uniform luminance in the display apparatus by utilizing the manner for selecting the reference luminance value, thus improving the efficiency of the display compensation as much as possible.

Optionally, the measured luminance values of the respective pixels can be compared to each other so as to obtain a maximum luminance value or a minimum luminance value, and the maximum luminance value or the minimum luminance value is taken as the reference luminance value.

By utilizing the manner for calculating the reference luminance value, the reference luminance value can be obtained in a simple and rapid way, and the circuit for implementation is simple in configuration; however, the shortcoming thereof is in that as a mode of rapid selection, the pixels other than the pixel having the maximum or minimum value need to be compensated in luminance, the efficiency of the display compensation is reduced to a large extent.

Of course, the three above manners for selecting the reference luminance value are only examples for illustration; it should be conceived that the user can also choose other known manners for selecting the reference value according to his/her own actual requirements, and the embodiments of the present disclosure make no limitation on this.

After the reference luminance value of R, the reference luminance value of G and the reference luminance value of B are obtained respectively, the method for display compensation provided in the embodiment of the present disclosure proceeds to step S203. At the step S203, the compensation coefficients for the respective pixels are obtained from the reference luminance value and the luminance values of the respective pixels.

In particular, in the embodiment of the present disclosure, when there is a difference between the luminance of a pixel and the reference luminance, a level of an input signal can be changed accordingly by multiplying the level of the input signal with the compensation coefficient so as to correct the luminance of the pixel, wherein the compensation coefficient can be acquired in a plurality of manners, and the present disclosure makes no limitation on this.

For instance, after the reference luminance value of R, the reference luminance value of G and the reference luminance value of B are obtained respectively, the reference luminance value of R, the reference luminance value of G and the reference luminance value of B can be divided by a luminance value of R, a luminance value of G and a luminance value of B of each of the pixels respectively, so as to obtain a compensation coefficient of R, a compensation coefficient of G, a compensation coefficient of B of each of the pixels respectively.

Taking a case in which the display apparatus outputs a full white test picture as an example, the luminance of a pixel in the display apparatus is measured in three colors RGB by a measuring instrument; presuming that the quantization values of the measured luminance of the pixel are as follows: the luminance value of R is 80, the luminance value of G is 100, the luminance value of B is 80, and the ratios of the luminance of the three colors RGB in the white light are not equal to each other. Further, presuming that the reference luminance value of R, the reference luminance value of G, and the reference luminance value of B, which are calculated and obtained from the luminance values of all of the pixels, are 100, 100 and 70 respectively. It can be seen from the above, the non-uniformity occurs in the display luminance of the pixel since the luminance value of R is too low and the luminance value of B is too high, and there is no need to adjust the luminance value of G. By calculation, it can be obtained that for the pixel, the compensation coefficient of R component is 1.25, the compensation coefficient of G component is 1, and the compensation coefficient of B component is 0.875; thus, the above compensation coefficients can be multiplied with the RGB signals inputted to the pixel so as to achieve homogenization between the display luminance of the pixel and the reference luminance value.

Further, as illustrated in FIG. 2, after the compensation coefficients are obtained, the method for display compensation provided in the embodiment of the present disclosure proceeds to step S204. At the step S204, the compensation coefficients are stored in a non-volatile memory so that the signal for each of the pixels can be compensated and corrected upon the display apparatus being turned on or reset.

The non-volatile memory can be various known non-volatile storage hardware including the hard disk driver; thus, when the user turns off the display apparatus or performs a reset operation on the display apparatus, the compensation coefficients which have been obtained can not disappear due to the power down of the storage medium. When the user turns on the display apparatus again or after the display apparatus completes the reset operation, the compensation coefficients of the respective pixels stored in the non-volatile memory will be multiplied with RGB signals for the pixels directly, so as to achieve the compensation for the output of the pixels in luminance.

In particular, at the step S205, the signals inputted to the respective pixels are compensated and corrected respectively according to the compensation coefficients.

In the procedure of an actual application of the display apparatus, for a pixel, a variation in luminance may occur due to a minor difference in the irradiation of the external light or the reasonable variation in the driving current/voltage, and in general, the variation in luminance varies in a small range and in a short time; if such a variation occurs exactly during the measuring phase for the display compensation, a unnecessary compensation might be performed, which has an adverse effect on the uniformity of the display apparatus in display. In order to prevent the reasonable random variation from influencing the display compensation, a threshold for value or time can be set so as to exclude the well-performed pixels having a variation in luminance due to random interference as much as possible, and to find the bad-performed pixels with non-uniform luminance.

For example, after the compensation coefficients of a pixel are obtained, it can be further determined that whether the absolute value of difference between the measured luminance value of the pixel and the reference luminance value falls into a preset numerical range, wherein the preset numerical range can be arbitrarily set according to an actual situation. In particular, if the absolute value of the difference falls into the preset numerical range, the pixel is determined as a point with a reasonable random variation, and it is unnecessary to perform a display compensation; otherwise, if the absolute value of the difference does not fall into the preset numerical range, the pixel is determined as a bad point, and further the signals inputted to the pixel are compensated and corrected respectively according to the compensation coefficients for the pixel. Naturally, the manner for determining the bad point is only an example for illustration, and the user can choose other known manners for determining the bad point according to the actual situation, and such manners are not enumerated in the present disclosure in detail.

According to the method for display compensation provided in the embodiment of the present disclosure, when the display apparatus in a uncompensated status outputs a full-color test picture, the luminance of each of the pixels in the full-color test picture outputted from the display apparatus is measured; the reference luminance value is obtained according to the measured luminance values of the respective pixels; compensation coefficients for the respective pixels are obtained according to the reference luminance value and the luminance values of the respective pixels, and the compensation and correction are performed to the signals inputted to the respective pixels by utilizing the compensation coefficients. In such a way, by measuring the luminance of each pixel in the full-color test picture outputted from the display apparatus, the non-uniformity among the luminance of the respective pixels in practical use can be known clearly, and the compensation coefficients can be obtained according to the actual luminance of each of the pixels and the reference luminance, and the luminance of each of the pixels can be compensated and corrected to the reference luminance by the compensation coefficients, so that the issue of non-uniform display effect in the display apparatus can be addressed effectively, thus improving the display effect of the display apparatus significantly.

The method for display compensation according to the embodiment of the present disclosure can be applied to various known display apparatus. Especially for AMOLED display apparatus, due to limitations of the crystallization process and the manufacture level of the AMOLED display apparatus, the non-uniformity occurs in the electrical parameters of the TFT switching circuit manufactured on the glass substrate with a large size such as threshold voltage, mobility and the like, so that the shift of the threshold voltage varies in the respective TFTs, which results in a current difference and a luminance difference among the respective OLED display elements; such differences are perceived by human eyes, and thus the issue of non-uniform display effect among the respective pixels arises. Even if an input voltage with a same grey level is applied to all the pixels, the issue of non-uniform among the pixels in luminance arises due to the non-uniformity among the respective pixels. The method for display compensation provided in the embodiment of the present disclosure can address the above issues greatly.

Firstly, a full-color luminance test is made on the manufactured AMOLED display apparatus; after the luminance of a full white test picture is identified, the luminance of each of the pixels is measured. Although the white picture is the mixture of three colors RGB, in order to improve the accuracy, the method, in which the full-color R picture, the full-color G picture, and the full-color B picture can be tested respectively, can also be utilized.

After the luminance of each of the pixels is measured, an average of the luminance of all of the pixels is calculated, and the average is taken as a reference luminance value.

The compensation coefficients of the respective pixels are obtained from the reference luminance value and the luminance values of the respective pixels.

In order to compensate for each of the pixels to make it approximate to the average, the luminance value of a pixel, which is less than the average, can be multiplied with a compensation coefficient larger than 1; and the luminance value of a pixel, which is larger than the average, can be multiplied with a compensation coefficient less than 1, so as to render a more uniform characteristic in luminance compared to that before the compensation.

For instance, the compensation coefficient of a pixel can be a ratio of the luminance value of the pixel to the reference luminance value (the average); when the luminance value of the pixel is less than the average, a compensation coefficient larger than 1 can be multiplied with, while when the luminance value of the pixel is larger than the average, a compensation coefficient less than 1 can be multiplied with, so that the luminance value of the pixel is adjusted to the average. Further, the voltage or the current for the pixel is adjusted according to the compensation coefficient so as to achieve the compensation and correction.

The compensation coefficients obtained as above can be stored in the non-volatile memory, and when the display apparatus starts up or resets, the input signals of the respective pixels are multiplied with the corresponding compensation coefficients respectively, and are converted to the input signals for the driving ICs, so as to obtain the updated luminance.

Since the compensation coefficients are applicable to all of the grey levels, they are suitable for the high grey level, the low grey level, the medial grey level and the like. However, during the procedure of the data processing, there is a possibility of signal loss. Therefore, in a case of the low grey level and medial grey level, there is a possibility of underflow; and in a case of the high grey level, there is a possibility of overflow.

In the embodiment of the present disclosure, upon the overflow, the grey level higher than the input grey levels can not be processed, and thus such a grey level can be neglected.

In order to improve the accuracy, except bits of the input signal, additional LSB bits can be allocated for calculation during the procedure of the data processing, and after the calculation, the LSB bits are deleted, thus reducing or eliminating the underflow of the data.

According to the method for display compensation provided in the embodiments of the present disclosure, by measuring the luminance of each pixel in the full-color test picture outputted from the display apparatus, the non-uniformity among the luminance of the respective pixels in practical use can be known clearly, and the compensation coefficients can be obtained according to the actual luminance of the respective pixels and the reference luminance, and the luminance of the respective pixels can be compensated and corrected to the reference luminance by the compensation coefficients, so that the issue of non-uniform display effect in the display apparatus can be addressed effectively, thus improving the display effect of the display apparatus significantly.

Figure 3:
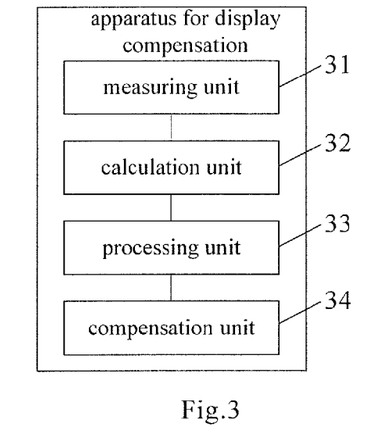
FIG. 3 is a schematic diagram illustrating a configuration of an apparatus for display compensation provided in an embodiment of the present disclosure.

FIG. 3 illustrates a schematic diagram illustrating a configuration of an apparatus for display compensation provided in an embodiment of the present disclosure. As illustrated in FIG. 3, the apparatus for display compensation comprises a measuring unit 31, a calculation unit 32, a processing unit 33 and a compensation unit 34.

The measuring unit 31 is configured, when a display apparatus in a uncompensated status outputs a full-color test picture, to measure luminance of each of pixels in the full-color test picture outputted from the display apparatus.

The calculation unit 32 is configured to obtain a reference luminance value according to the measured luminance values of the respective pixels.

The processing unit 33 is configured to obtain compensation coefficients for the respective pixels according to the reference luminance value and the luminance values of the respective pixels.

The compensation unit 34 is configured to perform compensation and correction on signals inputted to the respective pixels respectively according to the compensation coefficients.

In such an apparatus for display compensation, when the display apparatus in a uncompensated status outputs a full-color test picture, the luminance of each of pixels in the full-color test picture outputted from the display apparatus is measured; the reference luminance value is obtained according to the measured luminance values of the respective pixels; compensation coefficients for the respective pixels are obtained according to the reference luminance value and the luminance values of the respective pixels, and the compensation and correction are performed on signals inputted to the respective pixels respectively according to the compensation coefficients. In such a way, by measuring the luminance of each pixel in the full-color test picture outputted from the display apparatus, the non-uniformity among the luminance of respective pixels in practical use can be known clearly, and the compensation coefficients can be obtained according to the actual luminance of the respective pixels and the reference luminance, and the luminance of the respective pixels can be compensated for and corrected to the reference luminance by the compensation coefficients, so that the issue of non-uniform display effect in the display apparatus can be addressed effectively, thus improving the display effect of the display apparatus greatly.

The uncompensated status of the display apparatus can comprise an initial status in which the display apparatus is powered on and put into use at a first time, or a test status for luminance compensation which is set according to the user's practical requirements during the use of the display apparatus. In order to acquire the luminance variation of each of the pixels in the display apparatus intuitively and accurately, in an embodiment of the present disclosure, a full-color test picture is mainly adopted to observe the luminance of each of the pixels. It can be conceived that in an ideal situation, in the full-color test picture, the luminance outputted from each of the pixels in the display apparatus should be same, and the value of the same luminance is the value of the reference luminance. In such situation, since the value of the luminance of each of pixels is same as that of the reference luminance, it is unnecessary to perform a compensation and correction on the signals inputted to the respective pixels.

In an embodiment of the present disclosure, the full-color test picture can particularly include a full white test picture; as an alternative, the full-color test picture can include a full red test picture, a full green test picture and a full blue test picture.

Optionally, the measuring unit 31 can be further configured to, for each of pixels in the full-color test picture outputted from the display apparatus, measure the luminance of red color R, that of green color G and that of blue color B respectively.

Particularly, since the white light is constituted by three colors (red, green and blue (RGB)) lights according to certain proportion mix, when a full white test picture is adopted to test the luminance of the pixels, it is possible to only measure the luminance of the white light of each of the pixels; as an alternative, it is possible to measure the luminance of components RGB in the white light respectively by utilizing corresponding measuring instruments. Additionally, in a case in which the full-color test picture employs a full red test picture, a full green test picture and a full blue test picture, the luminance of RGB in the full red test picture, the full green test picture and the full blue test picture are measured by utilizing corresponding measuring instruments. In such a way, the difference in the luminance of colors can be compensated accurately.

Optionally, the calculation unit 32 can be further configured to acquire a reference luminance value of R, a reference luminance value of G, a reference luminance value of B according to the measured luminance value of R, that of G and that of B of each pixel respectively.

In particular, after the quantization values of the respective pixels on luminance are obtained, a value among the quantization values can be selected as a reference luminance value, and the luminance of the pixel can be adjusted according to the reference luminance value, so that the uniformity of the respective pixels of the display apparatus in the display luminance can be achieved.

Figure 4:
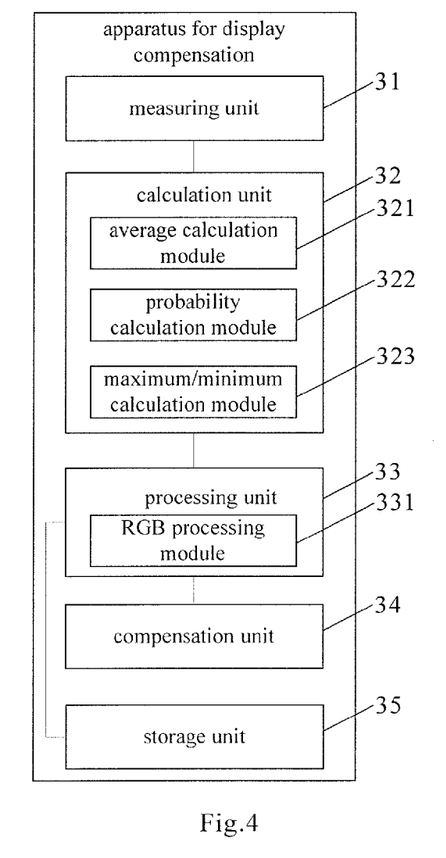
FIG. 4 is a schematic diagram illustrating a configuration of another apparatus for display compensation provided in an embodiment of the present disclosure.

It should be noted that the user can select the reference luminance value by utilizing a plurality of manners according to the actual requirements, and the present disclosure makes no limitation on this. In the embodiments of the present disclosure, as illustrated in FIG. 4, the calculation unit 32 can particularly comprise an average calculation unit 321, a probability calculation unit 322 or a maximum/minimum calculation unit 323.

The average calculation unit 321 can be configured to calculate and obtain the luminance average of all of the pixels from the measured luminance values of the respective pixels, and take the luminance average as the reference luminance value.

In general, the manner for calculating the average luminance from the luminance values of the respective pixels is simple, and the circuit configuration for implementing the calculation procedure is relative simple. Further, in the procedure of the actual application of the display apparatus, the luminance variations of the respective pixels normally satisfy a random distribution, the current luminance setting of the display apparatus is well approximated generally by taking the average luminance as the reference value, so that the number of the pixels which need to be compensated for can be reduced as much as possible, thus improving the efficiency of the display compensation.

The probability calculation unit 322 can be configured to calculate and obtain a luminance value with the highest probability in occurrence from the measured luminance values of the respective pixels, and to take the luminance value with the highest probability as the reference luminance value.

In such a manner for calculating the reference luminance value, the luminance value with the highest probability in occurrence is taken as the reference luminance value, so that it is avoided to compensate for the pixels having the same luminance as the luminance value with highest probability in occurrence. Especially, in a case in which the phenomenon of non-uniform luminance occurs in only a small portion of pixels in the display apparatus, it is unnecessary to compensate for the large portion of pixels with uniform luminance in the display apparatus by utilizing the manner for selecting the reference luminance value, thus improving the efficiency of the display compensation as much as possible.

The maximum/minimum calculation unit 323 can be configured to compare the measured luminance values of the respective pixels to each other so as to obtain a maximum luminance value or a minimum luminance value, and take the maximum luminance value or the minimum luminance value as the reference luminance value.

By utilizing the manner for calculating the reference luminance value, the reference luminance value can be obtained in a simple and rapid way, and the circuit for implementation is simple in configuration; however, the shortcoming thereof is in that as a mode of rapid selection, the pixels other than the pixel having the maximum or minimum value need to be compensated in luminance, the efficiency of the display compensation is reduced to a large extent.

Of course, the three above manners for selecting the reference luminance value are only examples for illustration; it should be conceived that the user can also choose other known manners for selecting the reference value according to his/her own actual requirements, and the embodiments of the present disclosure make no limitation on this.

In particular, in the embodiment of the present disclosure, when there is a difference between the luminance of a pixel and the reference luminance, a level of an input signal can be changed accordingly by multiplying the level of the input signal with the compensation coefficient so as to correct the luminance of the pixel, wherein the compensation coefficient can be acquired in a plurality of manners, and the present disclosure makes no limitation on this.

Optionally, as illustrated in FIG. 4, the processing unit 33 can further comprise a RGB processing module 331.

The RGB processing module 331 is configured to divide the reference luminance value of R, the reference luminance value of G and the reference luminance value of B by a luminance value of R, a luminance value of G and a luminance value of B of each of the pixels respectively, so as to obtain a compensation coefficient of R, a compensation coefficient of G, a compensation coefficient of B of each of the pixels respectively.

Taking a case in which the display apparatus outputs a full white test picture as an example, the luminance of a pixel in the display apparatus is measured in three colors RGB by a measuring instrument; presuming that the quantization values of the measured luminance of the pixel are as follows: the luminance value of R is 80, the luminance value of G is 100, the luminance value of B is 80, and the ratios of the luminance of the three colors RGB in the white light are not equal to each other. Further, presuming that the reference luminance value of R, the reference luminance value of G; and the reference luminance value of B, which are calculated and obtained from the luminance values of all of the pixels, are 100, 100 and 70 respectively. It can be seen from the above, the non-uniformity occurs in the display luminance of the pixel since the luminance value of R is too low and the luminance value of B is too high, and there is no need to adjust the luminance value of G. By calculation, it can be obtained that for the pixel, the compensation coefficient of R component is 1.25, the compensation coefficient of G component is 1, and the compensation coefficient of B component is 0.875; thus, the above compensation coefficients can be multiplied with the RGB signals inputted to the pixel so as to achieve homogenization between the display luminance of the pixel and the reference luminance value.

Optionally, as illustrated in FIG. 4, the apparatus for display compensation further comprises a storage unit 35 configured to store the compensation coefficients in a non-volatile memory so that the signals for each of the pixels can be compensated and corrected upon the display apparatus being turned on or reset.

The non-volatile memory can be various known non-volatile storage hardware including the hard disk driver; thus, when the user turns off the display apparatus or performs a reset operation on the display apparatus, the compensation coefficients which have been obtained can not disappear due to the power down of the storage medium. When the user turns on the display apparatus again or after the display apparatus completes the reset operation, the compensation coefficients of the respective pixels stored in the non-volatile memory will be multiplied with the signals for RGB pixels directly, so as to achieve the compensation for the output of the pixels in luminance.

Further, in the procedure of an actual application of the display apparatus, for a pixel, a variation in luminance may occur due to a minor difference in the irradiation of the external light or the reasonable variation in the driving current/voltage, and in general, the variation in luminance varies in a small range and in a short time; if such a variation occurs exactly during the measuring phase for the display compensation, a unnecessary compensation might be made, which has an adverse effect on the uniformity of the display apparatus in display. In order to prevent the reasonable random variation from influencing the display compensation, a threshold for value or time can be set so as to exclude the well-performed pixels having a variation in luminance due to random interference as much as possible, and to find the bad-performed pixels with non-uniform luminance.

For example, after the compensation coefficients of a pixel are obtained, it can be further determined that whether the absolute values of difference between the measured luminance value of the pixel and the reference luminance value falls into a preset numerical range, wherein the preset numerical range can be arbitrarily set according to an actual situation. In particular, if the absolute value of the difference falls into the preset numerical range, the pixel is determined as a point with a reasonable random variation, and it is unnecessary to perform a display compensation; otherwise, if the absolute value of the difference does not fall into the preset numerical range, the pixel is determined as a bad point, and further the signals inputted to the pixel are compensated and corrected respectively according to the compensation coefficients for the pixel. Naturally, the manner for determining the bad point is only an example for illustration, and the user can choose other known manners for determining the bad point according to the actual situation, and such manners are not enumerated in the present disclosure in detail.

According to the apparatus for display compensation provided in the embodiment of the present disclosure, by measuring the luminance of each pixel in the full-color test picture outputted from the display apparatus, the non-uniformity among the luminance of the respective pixels in practical use can be known clearly, and the compensation coefficients can be obtained according to the actual luminance of each of the pixels and the reference luminance, and the luminance of each of the pixels can be compensated and corrected to the reference luminance by the compensation coefficients, so that the issue of non-uniform display effect in the display apparatus can be addressed effectively, thus improving the display effect of the display apparatus significantly.

Figure 5:
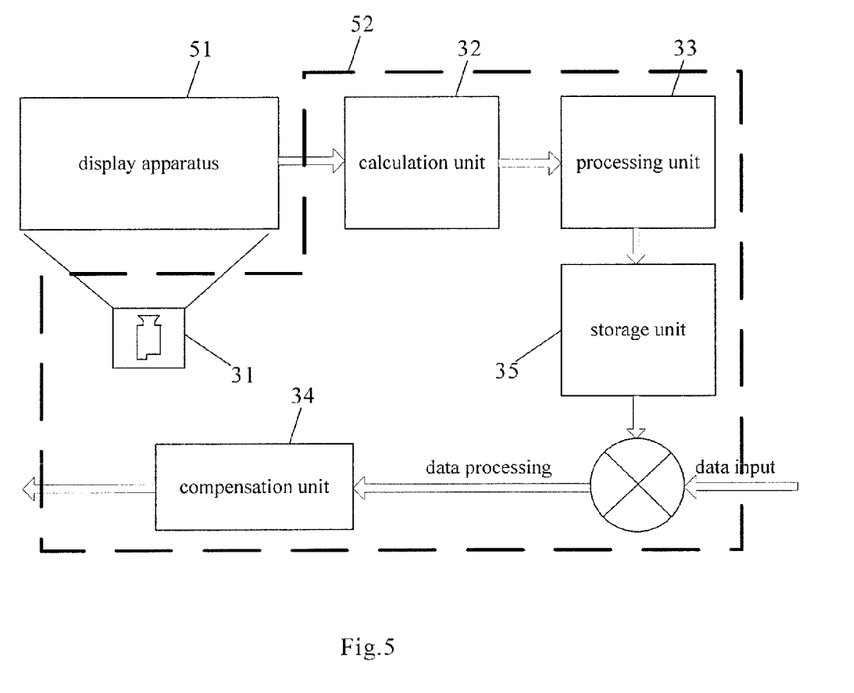
FIG. 5 is a schematic diagram illustrating a configuration of a system for display compensation provided in an embodiment of the present disclosure.

FIG. 5 illustrates a schematic diagram illustrating a configuration of a system for display compensation provided in an embodiment of the present disclosure. As illustrated in FIG. 5, the system for display compensation comprises a display apparatus 51 and the apparatus for display compensation as described above.

The apparatus for display compensation can be configured, when a display apparatus in a uncompensated status outputs a full-color test picture, to measure luminance of each of pixels in the full-color test picture outputted from the display apparatus; to obtain a reference luminance value according to the measured luminance values of the respective pixels; to obtain compensation coefficients for the respective pixels according to the reference luminance value and the luminance values of the respective pixels; and to perform compensation and correction on signals inputted to the respective pixels respectively according to the compensation coefficients.

In such a system for display compensation, when the display apparatus in a uncompensated status outputs a full-color test picture, the luminance of each of pixels in the full-color test picture outputted from the display apparatus is measured; the reference luminance value is obtained according to the measured luminance values of the respective pixels; compensation coefficients for the respective pixels are obtained according to the reference luminance value and the luminance values of the respective pixels, and the compensation and correction are performed on signals inputted to the respective pixels respectively according to the compensation coefficients. In such a way, by measuring the luminance of each pixel in the full-color test picture outputted from the display apparatus, the non-uniformity among the luminance of respective pixels in practical use can be known clearly, and the compensation coefficients can be obtained according to the actual luminance of the respective pixels and the reference luminance, and the luminance of the respective pixels can be compensated for and corrected to the reference luminance by the compensation coefficients, so that the issue of non-uniform display effect in the display apparatus can be addressed effectively, thus improving the display effect of the display apparatus greatly.

In particular, the display apparatus can adopt various known display apparatus comprising TFT-LCD, PMOLED and AMOLED, and the present disclosure makes no limitation on this. The detailed configuration of the apparatus for display compensation has been described as above, and the repeated descriptions are omitted.

Those skilled in the art can understand that all or part of steps in the above method/process embodiments can be implemented through hardware instructed by associated computer program. The associated computer program can be stored in a computer readable storage medium, and, when being executed, performs the steps of the above method/process embodiments. The storage medium can include any kind of medium capable of storing program codes such as ROM, RAM, magnetic disc, optical disc, etc.

The above descriptions are only for illustrating the embodiments of the present disclosure, and in no way limit the scope of the present invention. It will be obvious that those skilled in the art may make modifications, variations and equivalences to the above embodiments without departing from the spirit and scope of the present invention as defined by the following claims. Such variations and modifications are intended to be included within the spirit and scope of the present invention. The protection scope of the present invention should be defined by the attached claims.

The present application claims the priority of a Chinese application filed on Sep. 30, 2013, with No. 201310461487.9 and the invention title of "Method, Apparatus and System for Display Compensation", and the disclosure of which is entirely incorporated herein by reference.

What is claimed is:

1. A method for display compensation, comprising:
measuring a luminance value of each of pixels in a full-color test picture outputted from a display apparatus in a uncompensated status when the display apparatus outputs the full-color test picture;
calculating and obtaining a luminance value with a highest probability in occurrence from the measured luminance values of the respective pixels, and taking the luminance value with the highest probability as a reference luminance value;
obtaining compensation coefficients for the respective pixels according to the reference luminance value and luminance values of the respective pixels;
performing a compensation and correction on signals inputted to the respective pixels respectively according to the compensation coefficients.

2. The method for display compensation according to claim 1, wherein the full-color test picture comprises a full white test picture; or the full-color test picture comprises a full red test picture, a full green test picture and a full blue test picture;

wherein said measuring the luminance value of each of pixels in the full-color test picture outputted from the display apparatus comprises:

for each of the pixels in the full-color test picture outputted from the display apparatus, measuring a luminance value of red color R, a luminance value of green color G and a luminance value of blue color B respectively.

3. The method for display compensation according to claim 2, wherein said obtaining the reference luminance value according to the measured luminance values of the respective pixels comprises:

obtaining a reference luminance value of R, a reference luminance value of G, a reference luminance value of B according to the measured luminance values of R, luminance values of G and luminance values of B of the respective pixels respectively.

4. The method for display compensation according to claim 3, characterized in that said obtaining compensation coefficients for the respective pixels according to the reference luminance value and luminance values of the respective pixels comprises:

dividing the reference luminance value of R, the reference luminance value of G and the reference luminance value of B by the measured luminance value of a component R, the measured luminance value of a component G and the measured luminance value of a component B of each of the pixels respectively, and obtaining a compensation coefficient of the component R, a compensation coefficient of the component G, a compensation coefficient of the component B of each of the pixels respectively.

5. The method for display compensation according to claim 1, wherein after the compensation coefficients are obtained, the method further comprises:

storing the compensation coefficients in a non-volatile memory, so that signals for the respective pixels can be compensated and corrected when the display apparatus is turned on or reset.

6. An apparatus for display compensation, comprising:

a measuring unit configured to measure luminance value of each of pixels in a full-color test picture outputted from a display apparatus in a uncompensated status, when the display apparatus outputs the full-color test picture;

a probability calculation module configured to calculate and obtain a luminance value with a highest probability in occurrence from the measured luminance values of the respective pixels, and to take the luminance value with the highest probability as a reference luminance value;

a processing unit configured to obtain compensation coefficients for the respective pixels according to the reference luminance value and the luminance values of the respective pixels; and a compensation unit configured to perform a compensation and correction on signals inputted to the respective pixels respectively according to the compensation coefficients.

7. The apparatus for display compensation according to claim 6, wherein the full-color test picture comprises a full white test picture; or the full-color test picture comprises a full red test picture, a full green test picture and a full blue test picture;

wherein the measuring unit is further configured to, for each of the pixels in the full-color test picture outputted from the display apparatus, measure a luminance value of red color R, a luminance value of green color G and a luminance value of blue color B respectively.

8. The apparatus for display compensation according to claim 7, wherein the calculation unit is further configured to obtain a reference luminance value of R, a reference luminance value of G, a reference luminance value of B according to the measured luminance values of R, the measured luminance values of G and the measured luminance values of B of the respective pixels respectively.

9. The apparatus for display compensation according to claim 8, wherein the processing unit comprises:

a RGB processing module configured to divide the reference luminance value of R, the reference luminance value of G and the reference luminance value of B by the measured luminance value of a component R, the measured luminance value of a component G and the measured luminance value of a component B of each of the pixels respectively, and to obtain a compensation coefficient of the component R, a compensation coefficient of the component G, a compensation coefficient of the component B of each of the pixels respectively.

10. The apparatus for display compensation according to claim 6, further comprising:

a storage unit configured to store the compensation coefficients in a non-volatile memory, so that signals for the respective pixels are compensated and corrected when the display apparatus is turned on or reset.

11. A system for display compensation, comprising a display apparatus and the apparatus for display compensation according to claim 6, wherein the apparatus for display compensation is configured to:

measure luminance value of each of pixels in a full-color test picture outputted from the display apparatus in a uncompensated status when the display apparatus outputs the full-color test picture;

calculating and obtaining a luminance value with a highest probability in occurrence from the measured luminance values of the respective pixels, and taking the luminance value with the highest probability as a reference luminance value;

obtaining compensation coefficients for the respective pixels according to the reference luminance value and luminance values of the respective pixels;

performing a compensation and correction on signals inputted to the respective pixels respectively according to the compensation coefficients.

12. The system for display compensation according to claim 11, wherein the full-color test picture comprises a full white test picture; or the full-color test picture comprises a full red test picture, a full green test picture and a full blue test picture;

wherein the measuring unit is further configured to, for each of the pixels in the full-color test picture outputted from the display apparatus, measure a luminance value of red color R, a luminance value of green color G and a luminance value of blue color B respectively.

13. The system for display compensation according to claim 12, wherein the calculation unit is further configured to obtain a reference luminance value of R, a reference luminance value of G, a reference luminance value of B according to the measured luminance values of R, the measured luminance values of G and the measured luminance values of B of the respective pixels respectively.

14. The system for display compensation according to claim 13, wherein the processing unit comprises:

a RGB processing module configured to divide the reference luminance value of R, the reference luminance value of G and the reference luminance value of B by the measured luminance value of a component R, the measured luminance value of a component G and the measured luminance value of a component B of each of the pixels respectively, and to obtain a compensation coefficient of the component R, a compensation coefficient of the component G, a compensation coefficient of the component B of each of the pixels respectively.

15. The system for display compensation according to claim 11, wherein the apparatus for display compensation further comprises:
a storage unit configured to store the compensation coefficients in a non-volatile memory, so that signals for the respective pixels are compensated and corrected when the display apparatus is turned on or reset.

* * * * *